(12) United States Patent
Rothenhagen

(10) Patent No.: US 9,543,812 B2
(45) Date of Patent: Jan. 10, 2017

(54) MULTI-PHASE ELECTRIC CIRCUIT

(71) Applicant: GE Energy Power Conversion Technology Limited, Warwickshire (GB)

(72) Inventor: Kai Alexander Rothenhagen, Berlin (DE)

(73) Assignee: GE ENERGY POWER CONVERSION TECHNOLOGY LIMITED, Rugby Warwickshire (GB)

( * ) Notice: Subject to any disclaimer, the term of this patent is extended or adjusted under 35 U.S.C. 154(b) by 0 days.

(21) Appl. No.: 14/267,311

(22) Filed: May 1, 2014

(65) Prior Publication Data

US 2014/0327346 A1 Nov. 6, 2014

(30) Foreign Application Priority Data

May 2, 2013 (DE) .................. 10 2013 208 067

(51) Int. Cl.
*H02P 6/00* (2016.01)
*H02K 13/10* (2006.01)
*H02P 9/00* (2006.01)

(52) U.S. Cl.
CPC ............... *H02K 13/10* (2013.01); *H02P 9/007* (2013.01)

(58) Field of Classification Search
CPC ........ H02K 23/62; H02K 21/04; H02K 25/00; H02K 29/06; H02K 29/10; H02K 51/00; H02K 17/24; H02K 21/28; H02K 23/00; H02K 23/04; H02K 23/60; H02K 23/66; H02K 27/20; B60K 2006/262; B60K 6/26

USPC ................... 318/700, 490, 245, 721; 290/44
See application file for complete search history.

(56) References Cited

U.S. PATENT DOCUMENTS

| | | | | |
|---|---|---|---|---|
| 3,683,249 A | * | 8/1972 | Fukuo Shibata | B60K 6/48 290/30 R |
| 4,019,104 A | * | 4/1977 | Parker | H02K 17/24 310/113 |
| 4,602,200 A | * | 7/1986 | Walker | H02M 5/4505 318/798 |
| 4,698,721 A | * | 10/1987 | Warren | H02H 9/005 361/110 |
| 4,736,147 A | * | 4/1988 | Shizhang | H02P 1/46 318/737 |

(Continued)

FOREIGN PATENT DOCUMENTS

DE 197 37 578 A1 3/1999
DE 10 2008 009 276 A1 2/2008
(Continued)

OTHER PUBLICATIONS

German Office Action dated Feb. 20, 2014 which was issued in connection with German Patent Application No. 102013208067.0 which was filed on May 2, 2013.

(Continued)

*Primary Examiner* — Paul Ip
(74) *Attorney, Agent, or Firm* — GE Global Patent Operation; Catherine J. Toppin

(57) ABSTRACT

A multi-phase electric circuit including an electric machine and an inverter, wherein machine encompasses a rotor connected to the inverter via at least two brushes for each phase, wherein each of the brushes of each phase is connected to the inverter via a separate brush line.

10 Claims, 5 Drawing Sheets

(56) References Cited

U.S. PATENT DOCUMENTS

| | | | | |
|---|---|---|---|---|
| 4,873,463 A * | 10/1989 | Jones | H02K 29/10 | 310/177 |
| 4,929,579 A * | 5/1990 | Lassiter | C04B 35/653 | 501/133 |
| 4,949,023 A * | 8/1990 | Shlien | H02K 23/62 | 310/229 |
| 5,001,375 A * | 3/1991 | Jones | H02K 29/10 | 310/177 |
| 5,017,756 A * | 5/1991 | Gilliland | B23K 9/1087 | 219/130.32 |
| 5,522,653 A * | 6/1996 | Fulks | B60T 8/00 | 303/162 |
| 5,796,565 A * | 8/1998 | Verkhovskiy | H02H 7/097 | 361/29 |
| 5,804,934 A * | 9/1998 | Yamada | B60K 6/26 | 318/34 |
| 5,955,859 A * | 9/1999 | Baurand | H02H 7/0822 | 318/558 |
| 5,990,654 A * | 11/1999 | Skibinski | H02M 1/126 | 307/105 |
| 6,047,104 A * | 4/2000 | Cheng | H02K 27/20 | 310/229 |
| 6,081,082 A * | 6/2000 | Kim | H02M 7/60 | 310/129 |
| 6,208,537 B1 * | 3/2001 | Skibinski | H02M 1/12 | 363/40 |
| 6,222,331 B1 * | 4/2001 | Blum | H02K 29/06 | 318/721 |
| 6,580,194 B2 * | 6/2003 | Mizutani | H02K 11/026 | 310/239 |
| 6,847,186 B1 * | 1/2005 | Kerlin | H02P 25/16 | 318/747 |
| 6,879,478 B2 * | 4/2005 | Mendoza | H02H 3/048 | 361/93.1 |
| 7,050,279 B2 * | 5/2006 | Nojima | B60L 3/00 | 361/42 |
| 7,102,307 B2 * | 9/2006 | Shao | H02P 6/182 | 318/400.35 |
| 7,190,129 B1 * | 3/2007 | Haas | H02P 7/0044 | 318/245 |
| 7,242,175 B2 * | 7/2007 | Shao | H02P 1/029 | 318/400.21 |
| 7,285,929 B2 * | 10/2007 | Ahmed | E21B 43/128 | 310/68 B |
| 7,285,931 B2 * | 10/2007 | Ahmed | E21B 43/128 | 310/232 |
| 7,501,784 B2 * | 3/2009 | Schrepfer | H02K 11/40 | 318/629 |
| 7,598,751 B2 * | 10/2009 | Collins, Jr. | G01R 19/2513 | 324/649 |
| 7,709,972 B2 * | 5/2010 | Arinaga | F03D 7/0224 | 290/44 |
| 7,839,008 B2 | 11/2010 | Woldmann et al. | | |
| 8,362,789 B2 * | 1/2013 | Collins, Jr. | G01R 19/2513 | 324/649 |
| 9,018,863 B2 * | 4/2015 | Hoeijmakers | B60K 6/26 | 318/400.41 |
| 2002/0030414 A1 * | 3/2002 | Mizutani | H02K 11/026 | 310/51 |
| 2003/0098666 A1 * | 5/2003 | Shao | H02P 6/182 | 318/727 |
| 2003/0197989 A1 * | 10/2003 | Nojima | B60L 3/00 | 361/47 |
| 2004/0000885 A1 * | 1/2004 | Shao | H02P 6/182 | 318/400.34 |
| 2004/0085696 A1 * | 5/2004 | Mendoza | H02H 3/048 | 361/93.1 |
| 2005/0030002 A1 * | 2/2005 | Shao | H02P 1/029 | 324/76.77 |
| 2007/0046225 A1 * | 3/2007 | Ahmed | E21B 43/128 | 318/400.41 |
| 2007/0046235 A1 * | 3/2007 | Ahmed | E21B 43/128 | 318/400.41 |
| 2007/0182357 A1 * | 8/2007 | Schrepfer | H02K 11/40 | 318/632 |
| 2008/0036472 A1 * | 2/2008 | Collins | G01R 19/2513 | 324/649 |
| 2008/0067960 A1 * | 3/2008 | Maeda | B62D 5/046 | 318/400.02 |
| 2008/0211235 A1 * | 9/2008 | Labbe | F02N 11/0859 | 290/38 R |
| 2008/0238349 A1 * | 10/2008 | Cheng | H02P 6/16 | 318/400.05 |
| 2009/0058086 A1 * | 3/2009 | Arinaga | F03D 7/0224 | 290/44 |
| 2009/0079374 A1 * | 3/2009 | De Four | H02P 6/20 | 318/400.34 |
| 2009/0267553 A1 * | 10/2009 | Labbe | F02N 11/0851 | 318/430 |
| 2010/0026317 A1 * | 2/2010 | Collins, Jr. | G01R 19/2513 | 324/649 |
| 2010/0072933 A1 * | 3/2010 | Wuerstlein | G01P 3/42 | 318/490 |
| 2012/0001506 A1 * | 1/2012 | Orban | H02K 9/28 | 310/87 |
| 2012/0274250 A1 * | 11/2012 | Soares | H02P 23/0004 | 318/400.23 |
| 2012/0294716 A1 * | 11/2012 | Roesmann | F03D 7/0224 | 416/1 |
| 2013/0002088 A1 * | 1/2013 | Liu | H01R 39/06 | 310/222 |
| 2013/0127378 A1 * | 5/2013 | Hoeijmakers | B60K 6/26 | 318/79 |
| 2013/0147311 A1 * | 6/2013 | Li | H02K 23/00 | 310/232 |
| 2013/0193795 A1 * | 8/2013 | Kojima | H02K 15/095 | 310/177 |
| 2013/0278197 A1 * | 10/2013 | Sasaki | H03M 3/494 | 318/490 |

FOREIGN PATENT DOCUMENTS

| | | |
|---|---|---|
| DE | 10 2008 064 079 A1 | 6/2010 |
| EP | 0127909 A1 | 12/1984 |
| EP | 1919055 A2 | 5/2008 |
| GB | 191506723 A | 3/1916 |
| JP | 2013223400 A * | 10/2013 |
| WO | 2009091319 A1 | 7/2009 |
| WO | 2010121983 A1 | 10/2010 |

OTHER PUBLICATIONS

European Search Report and Opinion issued in connection with corresponding EP Application No. 14166680.0 on Apr. 26, 2016.

* cited by examiner

MULTI-PHASE ELECTRIC CIRCUIT

BACKGROUND OF THE INVENTION

Embodiments of the present invention relate to a multi-phase electric circuit comprising an electric machine, as well as comprising an inverter, wherein the machine encompasses a rotor, which is connected to the inverter via at least two brushes per phase.

Such an electric circuit is known, for example, from DE 10 2008 009 276 A1 or from DE 10 2008 064 079 A1. The stator of the asynchronous machine is connected therein to an electric energy supply grid and the rotor is connected to the energy supply grid via an inverter. The inverter can be constructed, for example, of two inverters, which are realized by means of power semiconductor devices, and a DC link, which is connected there between and which encompasses at least one capacitor.

The rotor can be set into rotation, for example with the help of wind power or water power or the like. If the rotor then carries out a rotation, electric energy is fed into the energy supply grid by means of the voltage, which is induced into the stator.

Due to its rotation, the rotor must be electrically connected to the inverter via brushes. In the case of asynchronous machines with higher performance, it can thereby be necessary to provide for a plurality of brushes for each phase. This can have the result that an undesired asymmetrical current flow is created via the brushes due to production-related differences between the brushes, which belong to a phase, for example.

A short-circuiting device, a so-called crowbar, is often connected to the connecting line between the rotor and the inverter. If a malfunction is determined during the operation of the electric circuit, the short-circuiting device is activated. This has the result that the three phases, which are supplied to the short-circuiting device, are short-circuited.

SUMMARY OF INVENTION

Embodiments of the present invention create an electric circuit, which prevents the afore-mentioned asymmetrical current flow, namely without or with a short-circuiting device.

Embodiments of the present invention solves this object by means of a multi-phase electric circuit. The multi-phase electric circuit comprises an electric machine, and an inverter, wherein the electric machine comprises a rotor connected to the inverter via at least two brushes for each phase, and each of the at least two brushes of each phase is connected to the inverter via a separate brush line.

According to an embodiment of the invention, each of the brushes of each phase is connected to the inverter via a separate brush line. This creates a series connection of the individual brushes to the respective assigned brush line. The current flow via this series connection is thus no longer solely dependent on the brush, but also on the brush line. Differences between the brushes of the same phase can thus no longer fully effect the current flow via the respective brush due to the series connection of each brush to the corresponding brush line, but only to a reduced extent. An asymmetric current flow via the brushes—which is present per se—can thus be reduced or even compensated completely.

In an embodiment of the invention, each of the brushes has a brush impedance and each of the brush lines has a line impedance, wherein the line impedance is larger than the brush impedance. A series connection of the brush impedance and of the line impedance is created in this manner, which has the result that different brush impedances of brushes of the same phase do not have a full effect any longer, but only a reduced effect due to the respective assigned line impedances.

An asymmetry of the brush impedances of the brushes of a phase is thereby prevented with the help of the line impedances of the respective corresponding brush lines.

In the case of a further embodiment of the invention, the brush impedance has a negative temperature coefficient. This negative temperature coefficient can then be compensated by a positive temperature coefficient of the respective corresponding line impedance.

More particularly, if a separate brush line is assigned to each brush. The explained asymmetric current flow via the brushes can thus be prevented in a simple manner or can even be compensated completely.

In the case of a further embodiment of the invention, each of the brush lines is connected to a multi-phase short-circuiting device via a short-circuiting device impedance, wherein the short-circuiting device is embodied to short-circuit the phases, which are connected to it. It is thereby attained with the help of the short-circuiting device impedances that the mode of operation of the defined series connections does not get lost. In particular, it is attained by means of the short-circuiting device impedances that the individual brush lines of a phase are not short-circuited with one another.

The short-circuiting device can thereby be configured from power semiconductor devices, which are connected anti-parallel and which are arranged in a star or delta connection. It is thereby particularly advantageous, if a separate pair of anti-parallel power semiconductor devices is assigned to each brush line.

In the case of a further embodiment of the invention, a separate current regulator is assigned to each inverter. It is thus possible to separately influence or to balance, respectively, the current across each of the brush lines and thus across each of the brushes.

BRIEF DESCRIPTION OF THE DRAWINGS

Further features, potential applications and advantages of the invention follow from the below description of exemplary embodiments of the invention, which are illustrated in the corresponding figures. All of the described or illustrated features thus form the subject matter of the invention, either alone or in combination, regardless of the combination thereof in the patent claims or the dependency thereof as well as regardless of the wording or illustration thereof, respectively, in the description or in the figures, respectively.

DETAILED DESCRIPTION

Figure 1:
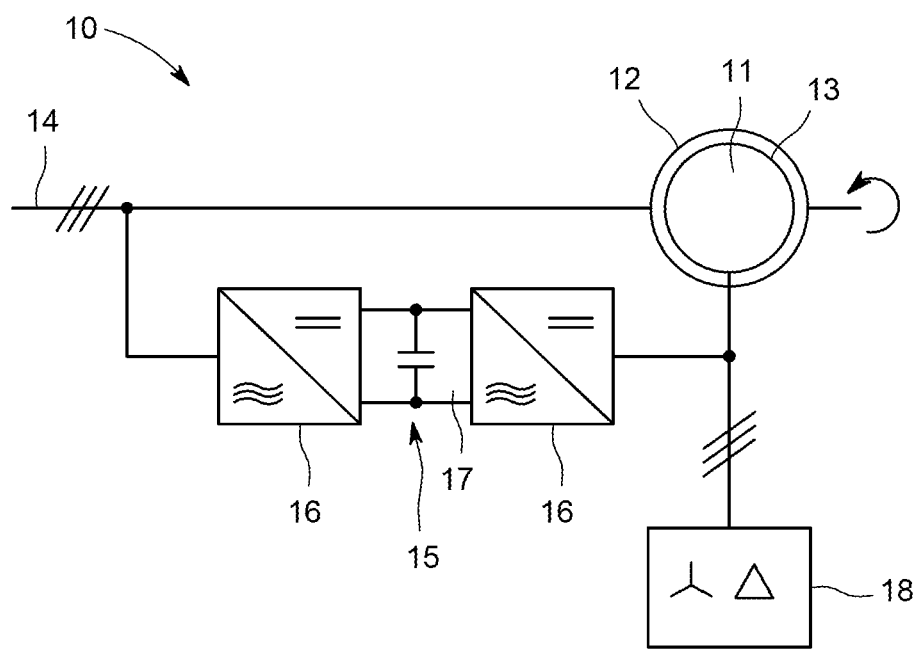
FIG. 1 shows a schematic block diagram of an exemplary embodiment of an electric circuit comprising a double-fed asynchronous machine.

An electric circuit 10, which encompasses a double-fed asynchronous machine 11 comprising a stator 12 and a rotor 13, is illustrated in FIG. 1. The stator 12 is connected to an electric energy supply grid 14. The rotor 13 is connected to the energy supply grid 14 via an inverter 15. It is pointed out that a parallel connection of a plurality of power converters can also be present instead of the inverter 15.

The inverter 15 is configured, for example, of two inverters 16, which are realized by means of power semiconductor devices, and a DC link 17, which is interconnected and which encompasses at least one capacitor. In addition, the inverter 15 typically encompasses a power choke or a separate transformer and, if applicable, an engine choke (not illustrated). A short-circuiting device 18, a so-called crowbar, is connected to the connecting line between the rotor 13 and the inverter 15.

For example, the electric circuit 10 is a three-phase circuit, only a one-phase illustration of which, however, is shown in FIG. 1. The asynchronous machine 11, the energy supply grid 14, the inverter 15 and the short-circuiting device 18 are accordingly embodied in a three-phase manner.

During operation of the electric circuit 10, a line voltage of the energy supply grid 14 is applied to the stator 12 of the asynchronous machine 11. The rotor 13 is coupled to an energy-generation system and can be rotated, for example with the help of wind power or water power or the like. The voltage at the rotor 13, in particular the frequency thereof, can be adapted to the respective boundary conditions, which are at hand in each case, with the help of the inverter 15, for example as a function of the speed of the rotor 13 and/or the line voltage of the energy supply grid 14 and/or the like. If the rotor 13 performs a rotational movement, electric energy is fed into the energy supply grid 14 by means of the voltage, which is induced into the stator 12.

If a malfunction is determined within the power generation system and/or the asynchronous machine 11 and/or the inverter 15 during operation of the electric circuit 10, the short-circuiting device 18 is activated. As a result, the three phases, which are supplied to the short-circuiting device 18, are short-circuited with the help of a star or delta connection by power semiconductor devices, which are connected antiparallel.

With regard to the rotational movement of the rotor 13, which was explained above, the asynchronous machine 11 is provided with brushes (not illustrated in FIG. 1) for the purpose of an electric connection of the inverter 15 to the rotor 13. The phases of the asynchronous machine 11 are also electrically connected to the inverter 15 in response to a rotational movement of the rotor 13, so that phase currents flow from the rotor 13 to the inverter 15 and vice versa across said brushes.

Figure 2A:
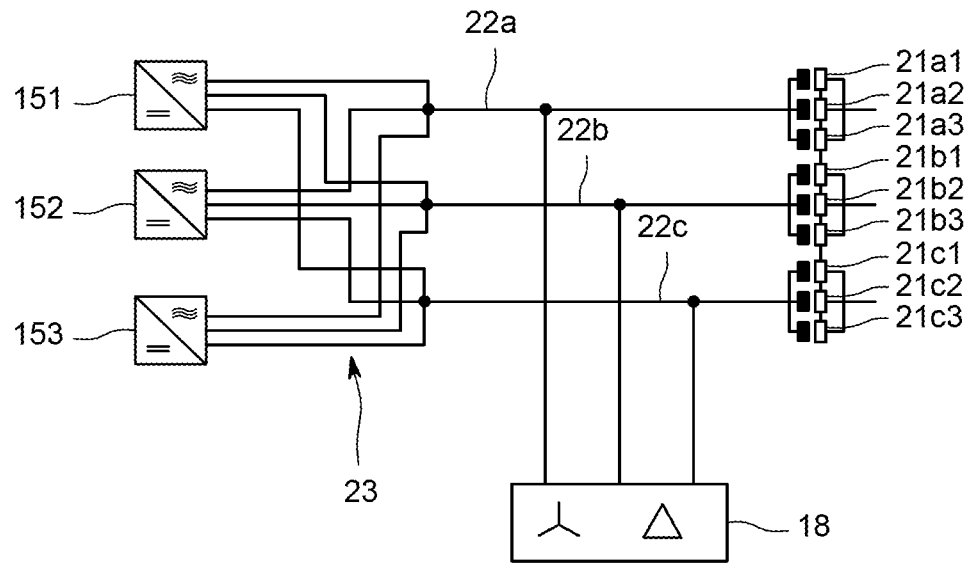
FIG. 2A shows a schematic circuit diagram of a part of the circuit of FIG. 1 according to an embodiment.

FIG. 2A illustrates that part of the electric circuit 10 of FIG. 1, which relates to the connection of the inverter 15 to the rotor 13 of the asynchronous machine 11. In particular, the above-mentioned brushes, which are not shown in FIG. 1, are illustrated in FIG. 2A. It is pointed out that FIG. 2A only serves to provide general explanations.

FIG. 2A is a three-phase illustration. The three phases are thereby always identified with the letters a, b, c.

FIG. 2A furthermore assumes an asynchronous machine 11 with a large output, which is why three inverters 151, 152, 153, which are connected in parallel to one another, are present.

Accordingly, FIG. 2A assumes phase currents, which are so large that an individual brush for each phase is not sufficient. Three brushes $21a1$, $21a2$, $21a3$, $21b1$, $21b2$, $21b3$, $21c1$, $21c2$, $21c3$ are thus in each case present for each phase, for example, which are connected in parallel to one another for each phase and which are short-circuited with one another on the inverter side and on the rotor side with regard to each phase.

The brushes 21 of each phase are connected to each of the three partial inverters 151, 152, 153. This is realized in that the three brushes 21 of each phase—as has already been explained—are short-circuit with one another on the inverter side, so as to then in each case be connected to an individual phase line $22a$, $22b$, $22c$. In the direction of the three inverters 151, 152, 153, these three phase lines $22a$, $22b$, $22c$ then split in each case into three individual lines 23, so that each of the phase lines $22a$, $22b$, $22c$ is connected to each of the three inverters 151, 152, 153. A phase of the short-circuiting device 18 is furthermore in each case connected to the three phase lines $22a$, $22b$, $22c$.

During operation of the electric circuit 10, phase currents flow from the three inverters 151, 152, 153 via the individual lines 23 and the phase lines $22a$, $22b$, $22c$ and via the respective three brushes 21 of the respective phase to the rotor 13 and vice versa. In response to a malfunction, the three phase lines $22a$, $22b$, $22c$ can be short-circuited with one another via the short-circuiting device 18.

Figure 2B:
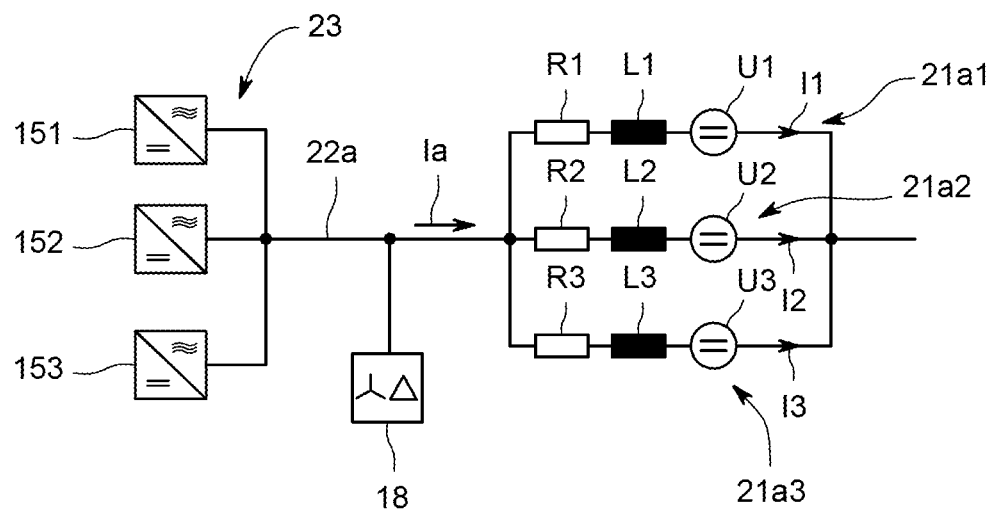
FIG. 2B shows a schematic equivalent circuit diagram of a phase of the circuit of FIG. 2A according to an embodiment.

FIG. 2B illustrates a phase of FIG. 2A, namely the phase, which belongs to the phase line $22a$, for example. It is pointed out that FIG. 2B as well as FIG. 2A—only serves to provide general explanations.

In FIG. 2B, the brushes $21a1$, $21a2$, $21a3$ are illustrated as equivalent circuit diagram, namely in each case substantially in the form of a brush impedance and of a voltage drop U1 or U2, respectively, or U3, respectively, wherein the brush impedance is embodied as series connection of a resistor R1 or R2, respectively, or R3, respectively, and of an inductor L1 or L2, respectively, or L3, respectively. A respective flowing brush current I1 or I2, respectively, or I3, respectively, is in each case shown in FIG. 2B for each of the brushes $21a1$, $21a2$, $21a3$. It is pointed out that the brush currents and the phase currents differ from one another. In FIG. 2B, the sum of the three brush currents I1, I2, I3 thus forms the corresponding phase current Ia on the phase line $22a$.

During operation of the electric circuit 10, the above-mentioned brush currents flow across the respective brushes of a phase and cause electric losses at that location in the respective brush impedance, which lead to a heat-up of the respective brush.

It is now assumed that the brushes 21 have a negative temperature coefficient. This means that the impedance of the individual brushes 21 decreases with an increasing temperature. As a result, the above-mentioned heat-up of the brushes 21 leads to a reduction of the impedance and thus to a larger current flow in the respective brushes 21.

In addition, it is assumed that the impedances of the individual brushes 21 are often not exactly the same due to production tolerances and/or other scattering, for example.

This asymmetry of the impedances of the brushes 21 has the result that the brush 21, which has the smallest impedance, conducts the highest current and thus heats up most. Due to this highest heat-up and of the negative temperature coefficient, the impedance of this brush 21 also decreases most, so that the current flow across this brush 21 becomes even larger. This thus creates an asymmetrical current flow across the brushes 21 of a phase, which can have the result that the current-carrying capacity of the brush 21, which has the largest current flow, is exceeded.

Figure 3A:
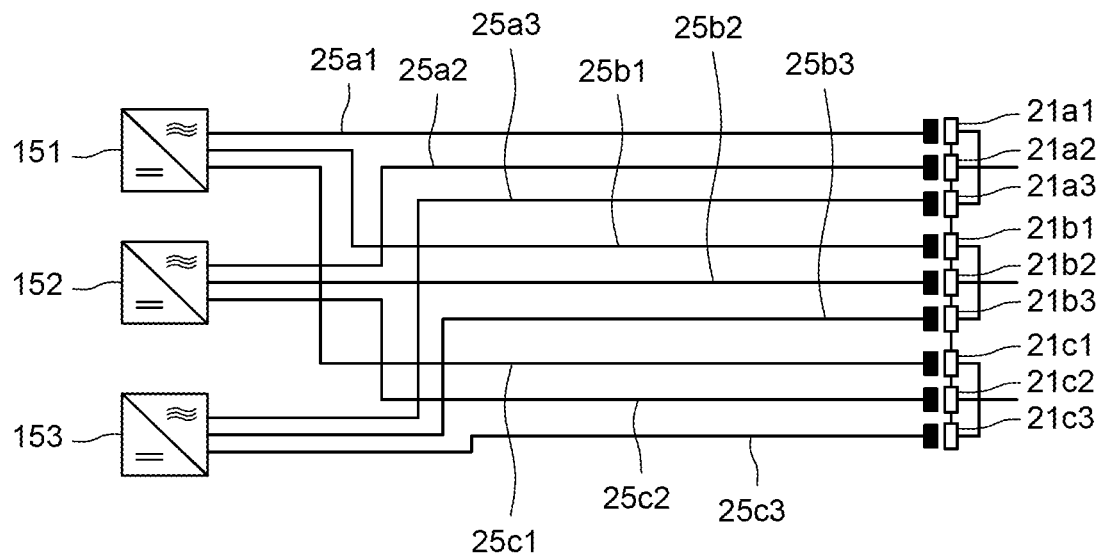
FIG. 3A shows a schematic circuit diagram of an exemplary embodiment of a part of the circuit of the figure according to an embodiment without a short-circuiting device.

FIG. 3A illustrates that part of the electric circuit 10 of FIG. 1, which relates to the connection of the inverter 15 to the rotor 13 of the asynchronous machine 11. FIG. 3A is a three-phase illustration. The three phases are thereby always identified with the letters a, b, c.

In addition, FIG. 3A assumes an asynchronous machine 11 with a large output, which is why three inverters 151, 152, 153, which are connected in parallel to one another, are present, for example. A separate current regulator can thereby be assigned to each of the inverters 151, 152, 153.

Accordingly, FIG. 3A assumes phase currents, which are so large that an individual brush for each phase is not sufficient. Three brushes 21a1, 21a2, 21a3, 21b1, 21b2, 21b3, 21c1, 21c2, 21c3 are thus in each case present for each phase, for example, which are connected in parallel to one another for each phase and which are short-circuit with one another on the rotor side with regard to each phase. The number of the brushes 21 for each phase thus corresponds to the number of the inverters 151, 152, 153, for example. It is pointed out that the number of the brushes for each phase can also be larger or smaller and does not need to correspond to the number of inverters.

In contrast to FIG. 2A, the brushes 21 of FIG. 3A are not short-circuited with one another on the inverter side.

The three brushes 21 of each phase are connected to a respective other one of the three inverters 151, 152, 153. This is realized in that a separate brush line 25a1, 25a2, 25a3, 25b1, 25b2, 25b3, 25c1, 25c2, 25c3 leads from each brush 21 in a phase to the corresponding one of the three inverters 151, 152, 153.

In contrast to FIG. 1 and to FIGS. 2A, 2B, a short-circuiting device 18 is not present in FIG. 3A.

During operation of the electric circuit 10, phase currents flow form the three inverters 151, 152, 153 across the brush lines 25 and across the respective three brushes 21 of the respective phase to the rotor 13 and vice versa.

Figure 3B:
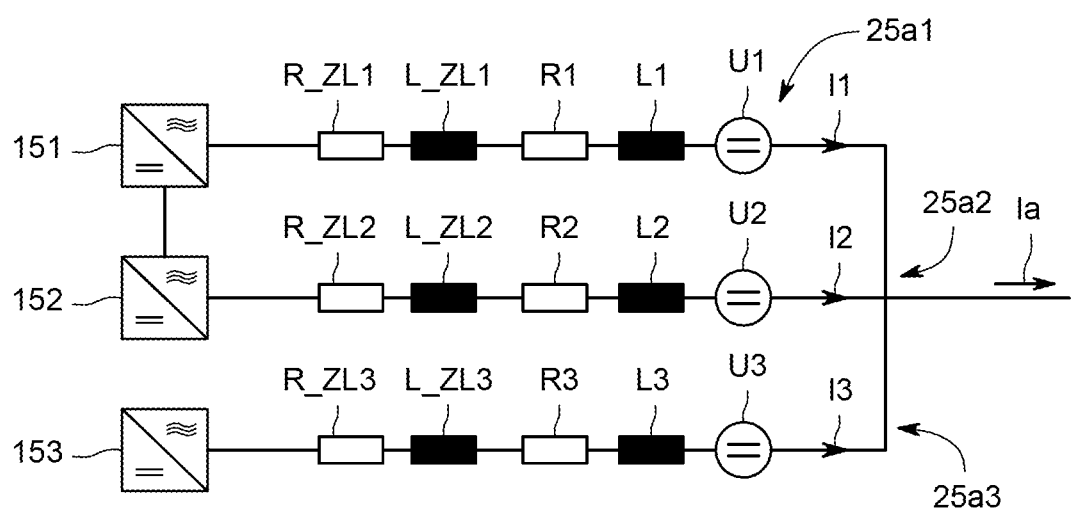
FIG. 3B shows a schematic equivalent circuit diagram of a phase of the circuit of FIG. 3A according to an embodiment.

FIG. 3B illustrates a phase of FIG. 3A, namely the phase, which belongs to the brush lines 25a1, 25a2, 25a3, for example.

FIG. 3B illustrates the brushes 21a1, 21a2, 21a3 as equivalent circuit diagram, namely in each case substantially in the form of a brush impedance and of a voltage drop U1 or U2, respectively, or U3, respectively, wherein the brush impedance is embodied as series connection of a resistor R1 or R2, respectively, or R3, respectively and of an inductor L1 or L2, respectively, or L3, respectively. The respective flowing brush current 11 or 12, respectively, or 13, respectively, is further shown for each of the brushes 21a1, 21a2, 21a3 in FIG. 3B. It is pointed out that the brush currents and the phase currents differ from one another. The sum of the three brush currents 11, 12, 13 thus forms the corresponding phase current Ia in FIG. 3B.

FIG. 3B furthermore illustrates the brush lines 25a1, 25a2, 25a3 as equivalent circuit diagram, namely in each case substantially in the form of a line impedance, which is embodied as series connection of a resistor R ZL1 or R ZL2, respectively, or R ZL3, respectively, and an inductor L ZL1 or L ZL2, respectively, or L ZL3, respectively.

During operation of the electric circuit 10, the above-mentioned brush currents flow across the respective brushes 21 of a phase and cause electric losses the respective impedance at that location, which leads to a heat-up of the respective brush 21.

It is now assumed that the brushes 21 have a negative temperature coefficient. This means that the impedance of the individual brushes 21 decreases with an increasing temperature.

According to FIG. 3B, however, each of the brushes 21 is connected in series to the corresponding brush line 25. The line impedances of the brush lines 25 encompass a positive temperature coefficient. This means that the line impedances of the individual brush lines 25 increase with an increasing temperature. The line impedance is thereby in particular a function of the length of the respective brush line 25.

The series connection of the brush impedance of the individual brushes 21 and of the line impedance of the respective corresponding brush lines 25 now has the result that the negative temperature coefficient of the respective brush 21 is compensated at least partially with the positive temperature coefficient of the corresponding brush line 25. This is synonymous for the fact that, due to a corresponding length of the brush lines 25, the negative temperature coefficient of the brushes 21 can at least be decreased or even compensated for the most part.

In the event that the impedances of the individual brushes 21 differ from one another, for example due to production tolerances and/or other scatterings, this asymmetry of the impedances of the brushes 21 is reduced to very small values by means of the positive temperature coefficient of the brush lines 25. In contrast to FIG. 2A, an asymmetrical current flow across the brushes 21 is thus not created at all in the case of FIG. 3A or only to a very small extent. The brush currents are thus substantially equal. An exceeding of the current-carrying capacity of one of the brushes 21 is thus prevented.

It is pointed out that the above-explained reduction or even compensation of asymmetries of the brush impedances can also be reached with the help of the line impedances, if the brushes 21 do not encompass a negative temperature coefficient, but any behavior or even a positive temperature coefficient in this regard. This follows from the fact that the line impedance of one of the brush lines 21 is typically larger than the brush impedance of the corresponding brush 25, so that the asymmetries of the brush impedances as compared to the corresponding line impedance are very small and are thus substantially negligible.

If the brush impedances of the brushes 21 of one of the phases per se thus encompass an asymmetry, a symmetry is thus attained at least to a certain extent by connecting these brush impedances in series to the respective corresponding line impedances. This is synonymous with the fact that the brush currents, which flow across the individual brush lines 25, are substantially even. An asymmetry of the currents, which flow across the brushes 21 of a phase, is thus no longer at hand.

FIGS. 4A, 4B, 4C, 4D are based on FIGS. 3A, 3B. In this regard, reference is made to the above explanations relating to FIGS. 3A, 3B.

In contrast to FIGS. 3A, 3B, a short-circuiting device 18 is present in FIGS. 4A, 4B, 4C, 4D.

Figure 4A:
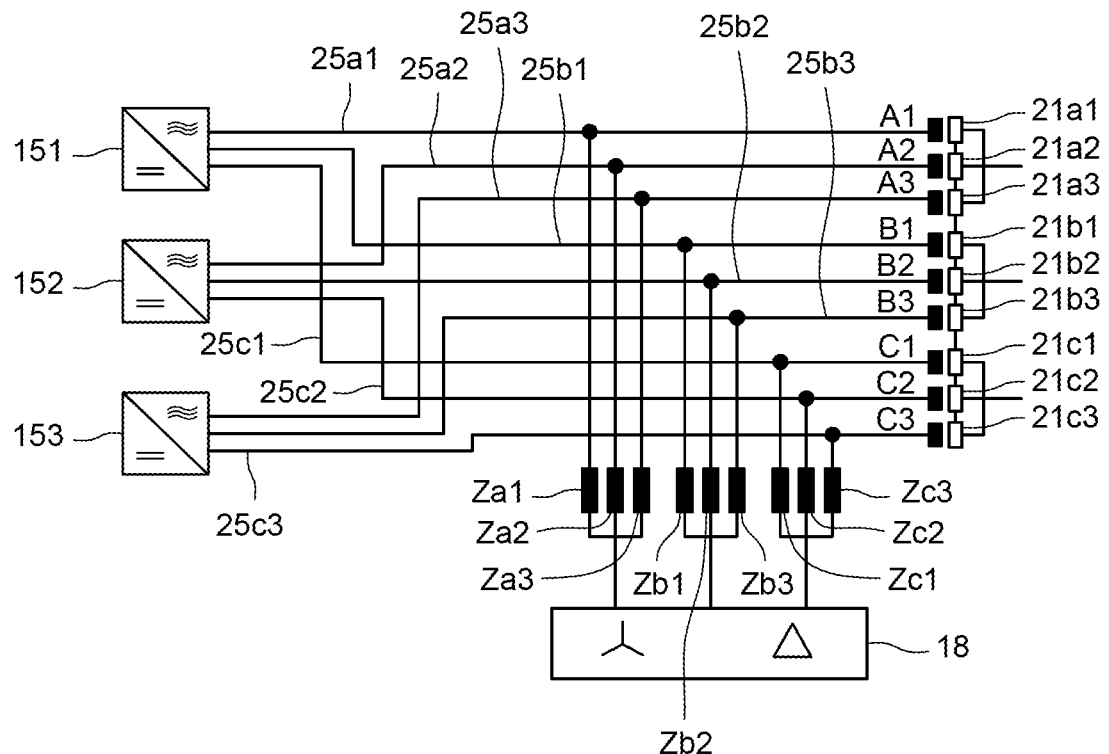
FIG. 4A shows a schematic circuit diagram of an exemplary embodiment of a part of the circuit of FIG. 1 according to an embodiment comprising a short-circuiting device.

According to FIG. 4A, each of the brush lines 25 of FIG. 4A is connected to the one connection of a short-circuiting impedance Za1, Za2, Za3, Zb1, Zb2, Zb3, Zc1, Zc2, Zc3 for the purpose of connecting the short-circuiting device 18. The short-circuiting impedances Za1, Za2, Za3 or Zb1, Zb2, Zb3, respectively, or Zc1, Zc2, Zc3, respectively, which belong to a phase, are then in each case short-circuited with one another via the other connection thereof and are connected to the respective phase of the short-circuiting device 18. The above-mentioned impedances are connected in parallel to one another in this regard.

Figure 4B:
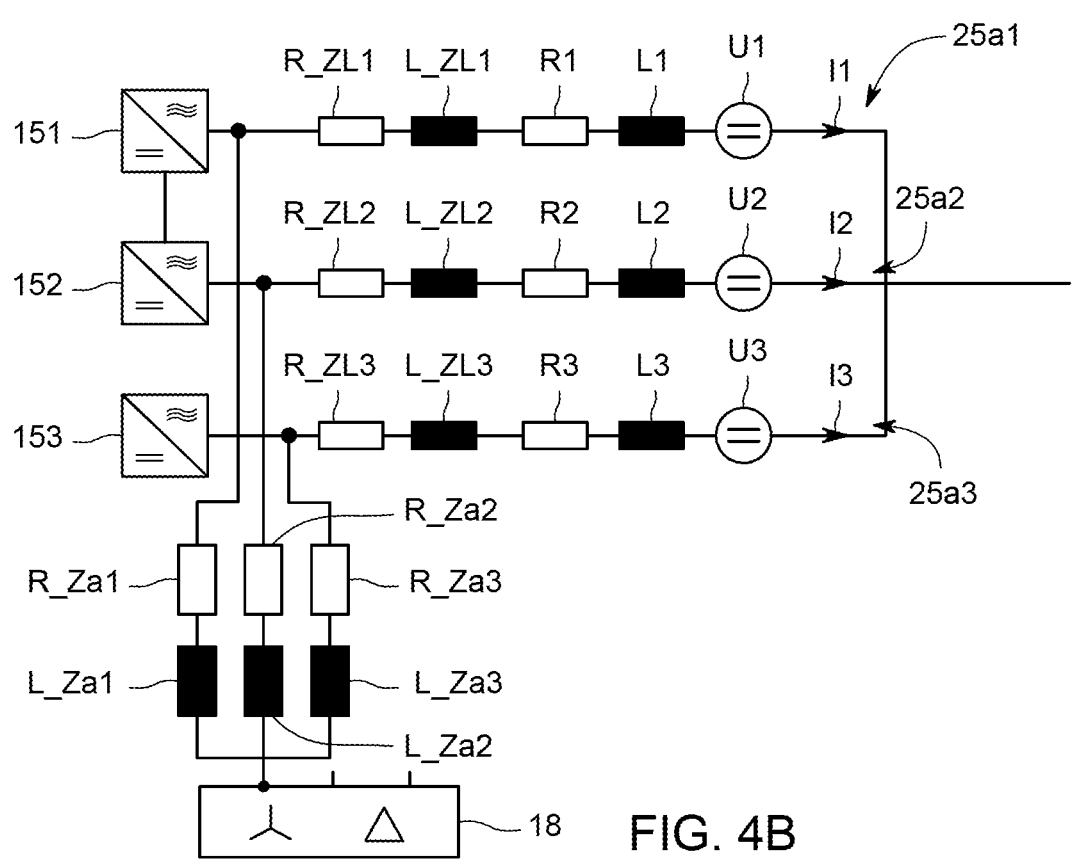
FIG. 4B shows a schematic equivalent circuit diagram of a phase of the circuit of FIG. 4A.

FIG. 4B illustrates the short-circuiting impedances Za1, Za2, Za3 as equivalent circuit diagram, namely in each case as series connection of a resistor R Za1 or R Za2, respectively, or R Za3, respectively, and an inductor L Za1 or L Za2, respectively, or L Za3, respectively. As already mentioned, the three series connections of the phase at hand are then short-circuited with one another on the side of the short-circuiting device 18 and are connected to the corresponding phase of the short-circuiting device 18.

Figure 4C:
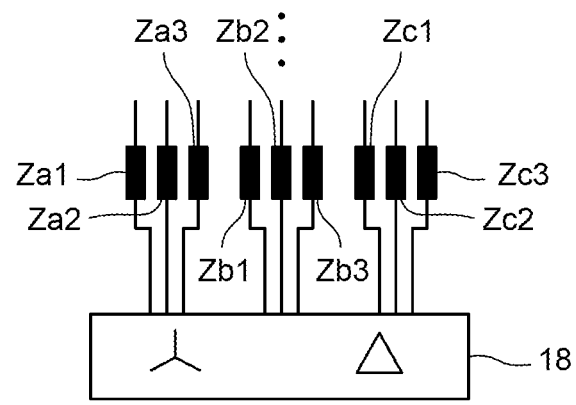
FIGS. 4C and 4D show modifications of FIGS. 4A and 4B according to embodiments of the present invention.

FIG. 4C illustrates a modification of the circuit of FIG. 4A. The modification is that the short-circuiting impedances Za1, Za3, Za3 or Zb1, Zb2, Zb3, respectively, or Zc1, Zc2, Zc3, which belong to a phase, are not in each case short-circuited with one another with the respective other connection thereof—as is the case in FIG. 4A—but that the short-circuiting impedances Za1, Za2, Za3 or Zb1, Zb2, Zb3, respectively, or Zc1, Zc2, Zc3, respectively, which belong to a phase, are in each case separately connected to the short-circuiting device 18.

Figure 4D:
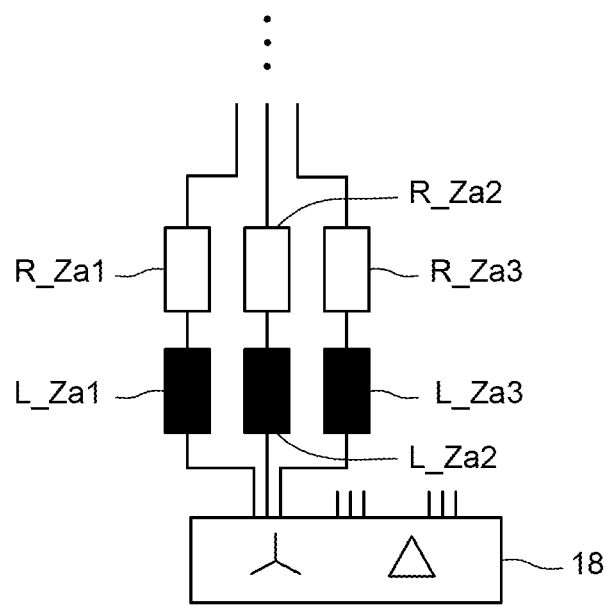

FIG. 4D illustrates a modification of the circuit of FIG. 4B. The modification is that the three series connections of a resistor R Za1 or R Za2, respectively, or R Za3, respectively, and of an inductor L Za1 or L Za2, respectively, or L Za3, respectively are not in each case short-circuited with one another on the side of the short-circuiting device 18—as is the case in FIG. 4B—but that the series connections are in each case separately connected to the short-circuiting device 18.

In FIGS. 4C, 4D, a separate pair of anti-parallel power semiconductor devices is thus assigned to each brush line 25a1, 25a2, 25a3, 25b1, 25b2, 25b3, 25c1, 25c2, 25c3 in the short-circuiting device 18, while in FIGS. 4A, 4B, the two power semiconductor devices, which are connected anti-parallel, are in each case always present in the short-circuiting device 18 at times.

As has already been explained, it is possible in a very general manner with the help of the brush lines 25 to attain a reduction or even a compensation of asymmetries of the brush impedances of a phase. Asymmetries of the current flow across the individual brushes of a phase can be reduced for the most part in this regard. In particular, it is possible with the help of the brush lines 25 to compensate for a negative temperature coefficient of the brushes 21.

As follows from FIGS. 4A, 4B, 4C, 4D, it is attained by means of the short-circuiting impedances Za1, Za2, Za3 or Zb1, Zb2, Zb3, respectively, or Zc1, Zc2, Zc3, respectively, that the brushes 21a1, 21a2, 21a3 or 21b1, 21b2, 21b3, respectively, or 21c1, 21c2, 21c3, respectively, are not short-circuited on the inverter side. Instead, one of the short-circuiting impedances Za1, Za2, Za3, which is in each case comprised of two series connections of the resistor R Za1, or R Za2, respectively, or R Za3, respectively, and the inductor L Za1 or L Za2, respectively, or L Za3, respectively, is in each case present between the individual brush lines 25a1, 25a2, 25a3 of the phase shown in FIG. 4B or 4D, respectively.

On the one hand, an impedance is thus present between each of the phases of FIG. 4A or 4C, respectively, and the short-circuiting device 18, namely the short-circuiting impedances Za1, Za2, Za3 or Zb1, Zb2, Zb3, respectively, or Zc1, Zc2, Zc3, respectively, which are connected in parallel for each phase. On the other hand, an impedance is in each case also always present between the individual brush lines 25 of each phase, which is always the sum of two of the above-mentioned short-circuiting impedances.

The short-circuiting impedances are thereby typically larger than the line impedances. It is attained with this that the short-circuiting impedances do not represent a short-circuiting of the individual brush lines of a phase, but that the above-mentioned reduction or even compensation of asymmetries of the brush impedances of a phase can continue to be attained with the help of the corresponding line impedances, even in the case of FIGS. 4A, 4B.

It goes without saying that the electric circuit 10 can accordingly also encompass a different phase number larger than or smaller than three and can optionally be embodied in a multi-phase manner in this regard. In these cases, the number and/or embodiment of the inverter 15 or of the inverters 151, 152, 153, respectively, and/or of the short-circuiting device 18 can also change. In addition, it goes without saying that the number of the brushes 21 for each phase can also be two or larger than three.

In addition, it is possible for the short-circuiting impedances in the equivalent circuit diagram of FIG. 4B to be connected in each case between the line impedances and the brush impedances. A reduction or even a compensation of asymmetries of the brush impedances of a phase can also be attained in this case with the help of the line impedances.

It goes without saying that either the respective resistance or the respective inductance can also be zero, if necessary, in the case of the mentioned impedances. Likewise, it is also not absolutely necessary for three inverters to be present, but it is easily possible for the exemplary embodiments of FIGS. 2A, 2B, 3A, 3B, 4A, 4C to also be realized with only a single inverter.

What is claim is:

1. A multi-phase electric circuit, comprising:
    an electric machine comprising a stator and a rotor, the stator being configured to connect to an electric energy supply grid;
    an inverter configured to connect to the electric energy supply grid;
    the rotor being connected to the inverter via at least two brushes for each phase, and each of the at least two brushes of each phase is connected to the inverter via a separate brush line;
    a multi-phase short-circuiting device connected to the brush lines coupling the rotor to the inverter; and
    each of the brush lines being connected to the multi-phase short-circuiting device via a short-circuiting impedance, the impedance being a resistor and an inductor connected in series within the brush line, and wherein the multi-phase short-circuiting device is embodied to short-circuit the phases connected to the multi-phase short-circuiting device.

2. The circuit according to claim 1, wherein each of the brushes has a brush impedance and each of the brush lines has a line impedance, the line impedance for each brush line being greater than brush impedance of the connected brush.

3. The circuit according to claim 2, wherein the line impedance of each of the brush lines for each phase is configured to reduce an asymmetry of the brush impedances of the brushes of the phase.

4. The circuit according to claim 3, wherein the brush impedance has a negative temperature coefficient.

5. The circuit according to claim 3, wherein a separate brush line is assigned to each brush.

6. The circuit according to claim 1, further comprising a plurality of inverters, wherein the number of the plurality of inverters corresponds to the number of the at least two brushes for each phase, and the at least two brushes of each phase are connected to another one of the plurality of inverters.

7. The circuit according to claim 6, wherein a separate current regulator is assigned to each of the plurality of inverters.

8. The circuit according to claim 1, wherein the multi-phase short-circuiting device is configured from power semiconductor devices connected anti-parallel and arranged in a star or delta connection.

9. The circuit according to claim 8, wherein a separate pair of anti-parallel power semiconductor devices is assigned to each of the at least two brush lines.

10. The circuit according to claim 1, wherein the inverter is connected to an electric energy supply grid, wherein a stator of a double-fed asynchronous machine is connected to the electric energy supply grid.

* * * * *

UNITED STATES PATENT AND TRADEMARK OFFICE
CERTIFICATE OF CORRECTION

| | |
|---|---|
| PATENT NO. | : 9,543,812 B2 |
| APPLICATION NO. | : 14/267311 |
| DATED | : January 10, 2017 |
| INVENTOR(S) | : Rothenhagen |

Page 1 of 1

It is certified that error appears in the above-identified patent and that said Letters Patent is hereby corrected as shown below:

On the Title Page

In Item (71), under "Applicants", in Column 1, Line 2, delete "Limited," and insert -- Limited, Rugby --, therefor.

In the Specification

In Column 4, Lines 47-48, delete "11 or 12, respectively, or 13," and insert -- I1 or I2, respectively, or I3, --, therefor.

In Column 4, Lines 51-52, delete "11, 12, 13" and insert -- I1, I2, I3 --, therefor.

In Column 5, Line 58, delete "11 or 12, respectively, or 13," and insert -- I1 or I2, respectively, or I3, --, therefor.

In Column 5, Line 62, delete "11, 12, 13" and insert -- I1, I2, I3 --, therefor.

In Column 7, Line 20, delete "Za3, Za3" and insert -- Za2, Za3 --, therefor.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*